United States Patent
Hikichi (10) Patent No.: US 12,174,686 B2
(45) Date of Patent: Dec. 24, 2024

(54) IMAGE FORMING APPARATUS, CONTROL METHOD THEREFOR, AND STORAGE MEDIUM

(71) Applicant: CANON KABUSHIKI KAISHA, Tokyo (JP)

(72) Inventor: Atsushi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 17/843,846

(22) Filed: Jun. 17, 2022

(65) Prior Publication Data

US 2022/0404893 A1    Dec. 22, 2022

(30) Foreign Application Priority Data

Jun. 21, 2021 (JP) ................. 2021-102670

(51) Int. Cl.
*G06F 1/3215* (2019.01)
*G06F 1/3234* (2019.01)

(52) U.S. Cl.
CPC .......... *G06F 1/3284* (2013.01); *G06F 1/3215* (2013.01)

(58) Field of Classification Search
CPC ... G06F 1/3215; G06F 1/3284; G06K 15/406; Y02D 10/00

USPC .......................................... 713/323
See application file for complete search history.

(56) References Cited

U.S. PATENT DOCUMENTS

| | | | | |
|---|---|---|---|---|
| 11,747,881 B2* | 9/2023 | Fukushi | ................ | G06F 1/3284 382/103 |
| 2002/0178389 A1* | 11/2002 | Satoh | .................. | H04N 1/00928 713/310 |
| 2018/0321732 A1* | 11/2018 | Fukushi | ................ | G06F 3/1204 |
| 2019/0068819 A1* | 2/2019 | Hikichi | .............. | H04N 1/00933 |
| 2020/0092434 A1* | 3/2020 | Tanaka | ............... | H04N 1/00917 |

FOREIGN PATENT DOCUMENTS

JP          2018-187848 A      11/2018

* cited by examiner

*Primary Examiner* — Chun Cao
(74) *Attorney, Agent, or Firm* — Canon U.S.A., Inc. IP Division (57) ABSTRACT

When a power state of an image forming apparatus is switched to a sleep state based on occurrence of an event, during a predetermined period after the occurrence of the event, the image forming apparatus does not return from the sleep state in a case where a return-from-sleep event corresponding to pressing a touch panel or pressing a key occurs, and returns from the sleep state in a case where a return-from-sleep event corresponding to an event other than pressing the touch panel and pressing the key occurs.

6 Claims, 5 Drawing Sheets

IMAGE FORMING APPARATUS, CONTROL METHOD THEREFOR, AND STORAGE MEDIUM

BACKGROUND

Field

The present disclosure relates to an image forming apparatus, a control method for the image forming apparatus, and a storage medium.

Description of the Related Art

With an improvement of a power saving function, an image forming apparatus provides a function of keeping the image forming apparatus in a standby state with lower power consumption while the image forming apparatus is not used by a user. More specifically, if a power saving event, such as pressing of a power saving key or expiration of a sleep timer, occurs in a first standby state (an active state) with higher power consumption, the image forming apparatus transitions to a second standby state (a sleep state) with lower power consumption. The active state corresponds to a state where, for example, a printer or a scanner is energized to be ready for immediately executing a job such as copying. The sleep state corresponds to a state where, for example, the printer or the scanner is powered off and an operation screen is turned off.

After the image forming apparatus transitions from the active state to the sleep state, post-printing processes occur in a printer device. Examples of such post-printing processes include an operation of rotating a fan to cool down the printer, an operation of closing a charging shutter, and an operation of turning off a power supply relay switch to control the printer. On the contrary, after the image forming apparatus transitions from the sleep state to the active state, pre-printing processes occur in the printer device. Examples of such pre-printing processes include an operation of turning on the power supply relay switch and an operation of warming the printer.

Such processes act on the printer device in an analog manner by, for example, rotating a gear or increasing or decreasing power, which takes a certain period of time. If the image forming apparatus frequently transitions from the active state to the sleep state, the operation of the printer device cannot keep up with the transitions. On top of that, the power supply relay switch having a limited cycle life is repeatedly turned on and off. Accordingly, frequent transitions from the active state to the sleep state can be a cause of shortening the lifetime of products, or a remote cause of a failure.

In view of the above, a device protection measure is taken in order not to repeat the processing required for transitioning from the active state to the sleep state in a short period of time after transitioning from the sleep state to the active state. More specifically, a time period in which an event handler corresponding to a power state transition event is not executed can be set as the device protection measure. Such device protection measure prevents a power state transition, such as turning on or off the power supply relay switch of the printer device, from being repeated in a short period of time in a case where a plurality of power state transition events continuously occurs.

Japanese Patent Application Laid-Open No. 2018-187848 discusses a technique in which, in an image forming apparatus that recognizes two types of return factors including detection by a human detection sensor and detection by a touch panel, an operation on a touch panel is disabled for a predetermined period after the image forming apparatus returns to a normal power state upon detection by the human detection sensor. This technique makes it possible to prevent the image forming apparatus from transitioning to a power saving state again immediately after returning to the normal power state, due to a software power saving key being touched on the touch panel immediately after the image forming apparatus returns to the normal power state upon detection by the human detection sensor.

SUMMARY

According to various embodiments of the present disclosure, an image forming apparatus configured to switch between a first power state and a second power state that is lower in power consumption than the first power state comprises one or more controllers having one or more processors and one or more memories, the one or more controllers configured to switch a power state of the image forming apparatus based on occurrence of an event. When the power state of the image forming apparatus is switched to the second power state based on occurrence of an event, during a predetermined period after the occurrence of the event, the power state is not switched to the first power state in a case where a specific event corresponding to switching to the first power state occurs, and the power state is switched to the first power state in a case where an event corresponding to switching to the first power state and different from the specific event occurs.

Further features of the present disclosure will become apparent from the following description of example embodiments with reference to the attached drawings.

DESCRIPTION OF THE EMBODIMENTS

First, issues to be addressed by an example embodiment of the present disclosure will be described using specific examples.

In terms of device protection, it is desirable to prohibit an apparatus from returning to an active state again for a certain period of time after entering a sleep state from the active state, as in the case of prohibiting the apparatus from entering the sleep state again for a certain period of time after returning from the sleep state to the active state. However, in a case where the apparatus enters the sleep state from the active state, if the operation of returning to the active state is prohibited for a certain period of time, an appropriate return operation may not be performed depending on a user operation sequence or timing, which may make the user unable to perform the subsequent operation. A first specific example will be described. For example, an operation of opening a front door cover is an event for returning from the sleep state to the active state. When the front door cover is opened in the sleep state, the apparatus returns to the active state. For example, the user opens the front door cover during the sleep state to return the apparatus to the active state. The user then presses, on a user interface (UI) operation unit, a software key corresponding to opening a toner cover to electrically open the toner cover inside the front door, so that the user can perform a toner replacement operation.

However, if the user opens the front door cover immediately after pressing a power saving key to cause the apparatus to enter the sleep state from the active state, the operation of returning to the active state by the opening of the front door cover is prohibited, so that the apparatus cannot return from the sleep state to the active state. In this case, the operation of returning to the active state by the pressing of the power saving key is also prohibited, so that the apparatus cannot return from the sleep state to the active state even if the power saving key is pressed. As described above, with the configuration in which, in a case where the apparatus enters the sleep state from the active state, the operation of returning to the active state again is prohibited for a certain period of time, it may not be possible for the user to open the toner cover inside the front door and perform the toner replacement operation.

A second specific example will be described.

For example, an operation of inserting or removing a sheet into or from a side manual multi paper feed unit is an event for returning from the sleep state to the active state. The user inserts a print sheet into the side manual multi paper feed unit to cause the apparatus to return to the active state, and then selects, through the UI operation unit, a sheet size and material appropriate for the sheet to be fed and issues a print instruction for copying, printing, or the like.

For example, suppose that the user inserts a print sheet into the side manual multi paper feed unit immediately after pressing the power saving key to cause the apparatus to enter the sleep state from the active state. In this case, with the configuration in which an event for entering the sleep state (hereinafter also referred to as a sleep entry event) and an event for returning from the sleep state (hereinafter also referred to as a return-from-sleep event) are prohibited for a certain period of time, the operation of returning to the active state by the insertion or removal of a sheet is prohibited, so that the apparatus cannot return from the sleep state to the active state. In this case, the operation of returning to the active state by the pressing of the power saving key is also prohibited, so that the apparatus cannot return from the sleep state to the active state even if the power saving key is pressed. As described above, with the configuration in which, in a case where the apparatus enters the sleep state from the active state, the operation of returning to the active state again is prohibited for a certain period of time, it may not be possible for the user to select the type of print sheet and perform a print operation.

As described above, if the operation of returning to the active state is prohibited for a certain period of time after the apparatus enters the sleep state from the active state, an appropriate return operation may not be performed depending on a user operation sequence or timing, which may make the user unable to perform the subsequent operation.

The present disclosure has been made to address the above-described issues. The present disclosure is directed to providing a mechanism for enabling an apparatus to appropriately return from the sleep state while preventing the apparatus from frequently transitioning between the active state and the sleep state.

Example embodiments of the present disclosure will be described below with reference to the drawings.

<Configuration of System>

Figure 1:
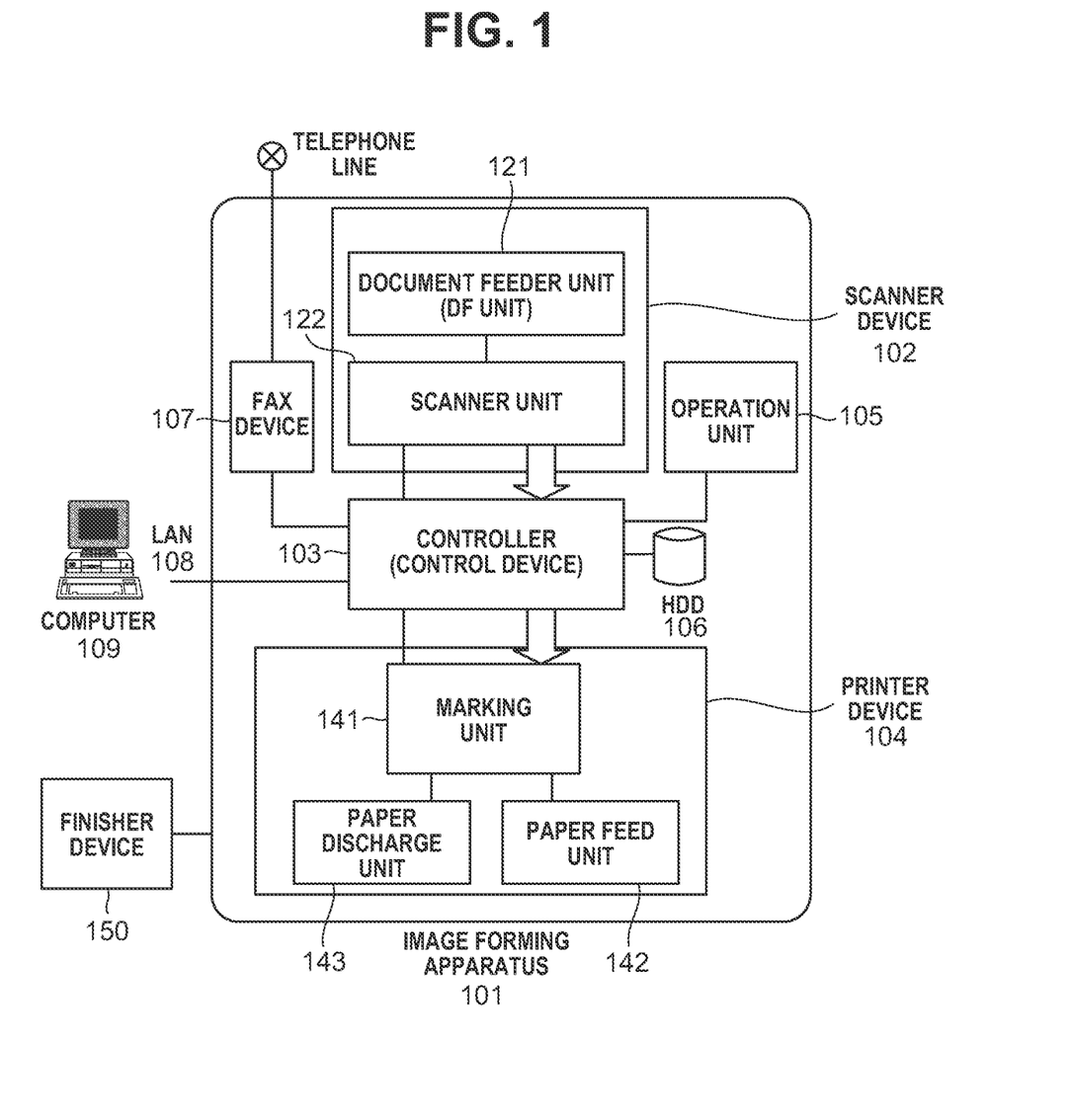
FIG. 1 is a block diagram illustrating a configuration of a system including an image forming apparatus according to an example embodiment of the present disclosure.

FIG. 1 is a block diagram illustrating an example of a configuration of a system including an image forming apparatus according to an example embodiment of the present disclosure. A multifunction peripheral including a print function, a scanner function, and a data communication function will be described as an example of the image forming apparatus according to the present example embodiment. However, the image forming apparatus according to the present example embodiment is not limited thereto.

An image forming apparatus 101, which is the image forming apparatus according to the present example embodiment, is configured to communicate with a computer 109 via a local area network (LAN) 108 and to receive a job from the computer 109. One or more computers 109 may be connected to the image forming apparatus 101.

The image forming apparatus 101 includes modules such as a controller 103, a scanner device 102, a printer device 104, an operation unit 105, a hard disk drive (HDD) 106, and a facsimile (FAX) device 107.

The scanner device 102 optically scans an image on a document and converts the scanned image into a digital image.

The printer device 104 outputs the digital image onto a sheet or the like.

The operation unit 105 receives settings about the image forming apparatus 101 from a user, and includes a touch panel for displaying a processing state or the like and hardware keys.

The HDD 106 stores digital images, control programs, and the like. Other type of nonvolatile storage device, such as a solid state drive (SSD) or an embedded multimedia card (eMMC), may be provided instead of the HDD 106, or may be used in combination with the HDD 106.

The FAX device 107 transmits or receives digital images via a telephone line or the like.

The controller 103 is a control device that is connected to each of the scanner device 102, the printer device 104, the operation unit 105, the HDD 106, and the FAX device 107, and transmits an instruction to each of the modules to execute a job in the image forming apparatus 101.

The image forming apparatus 101 is configured to communicate with the computer 109 via the LAN 108. The communication with the computer 109 enables the image forming apparatus 101 to, for example, input or output digital images, issue jobs, and transmit instructions to devices.

The scanner device 102 includes a document feeder unit (a DF unit) 121 and a scanner unit 122. The DF unit 121 is configured to automatically and sequentially feed documents one by one from a document bundle. The scanner unit 122 is configured to optically scan an image on a document and convert the scanned image into digital image data. The image data generated by the scanner unit 122 is transmitted to the controller 103.

The printer device 104 includes a paper feed unit 142, a marking unit 141, and a paper discharge unit 143. The paper feed unit 142 is configured to sequentially feed sheets one by one from a sheet bundle. The marking unit 141 is configured to print image data on the fed sheets. The paper discharge unit 143 is configured to discharge the sheets after printing.

A finisher device 150 performs processes, such as sheet discharging, sorting, stapling, punching, and cutting, on the sheets output from the paper discharge unit 143 of the printer device 104 in the image forming apparatus 101.

Figure 3:
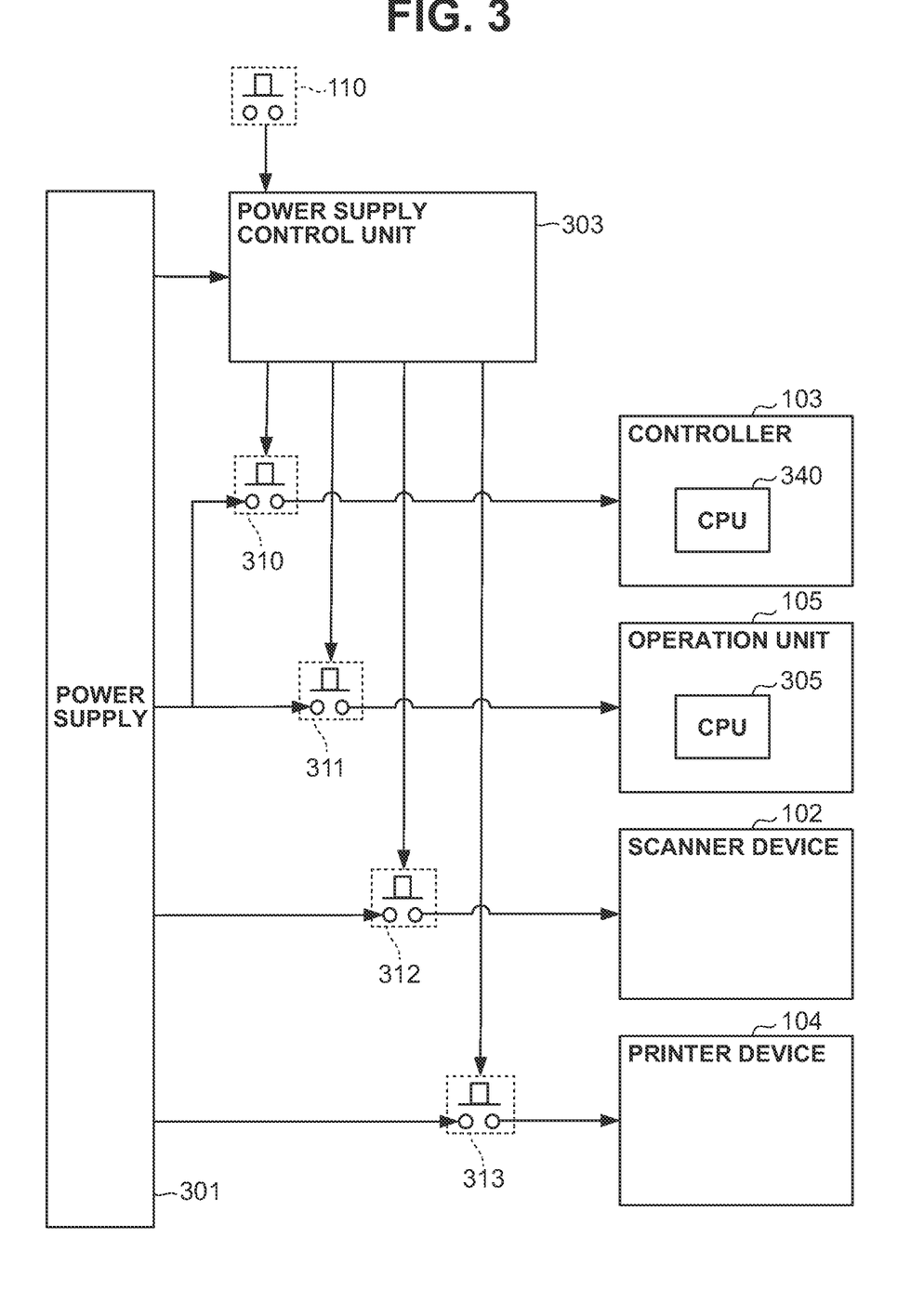
FIG. 3 is a block diagram illustrating a configuration of a power supply of the image forming apparatus according to the example embodiment.

The image forming apparatus 101 also includes a power switch 110 (see FIG. 3) for controlling power feeding from a power supply 301 (see FIG. 3). When the power switch 110 is turned off, the image forming apparatus 101 waits for software or hardware termination processing, and stops power feeding to portions other than a portion used to detect turning on of the power switch 110. The details thereof will be described in detail below with reference to FIG. 3.

<Functions of System>

Examples of jobs (functions) executable by the image forming apparatus 101 will be described.

[Copy Function]

The image forming apparatus 101 has a copy function of recording an image scanned by the scanner device 102 on the HDD 106 and simultaneously printing the image using the printer device 104.

[Image Transmission Function]

The image forming apparatus 101 has an image transmission function of transmitting an image scanned by the scanner device 102 to the computer 109 via the LAN 108.

[Image Storage Function]

The image forming apparatus 101 has an image storage function of recording an image scanned by the scanner device 102 on the HDD 106 and transmitting or printing the image as appropriate.

[Image Print Function]

The image forming apparatus 101 has an image print function of analyzing, for example, a page description language transmitted from the computer 109 and performing printing using the printer device 104.

<Configuration of Operation Unit>

The operation unit 105 is connected to the controller 103, and includes an liquid crystal display (LCD) touch panel, a power saving key, a copy button, a cancel button, a reset button, a numeric keypad, and a user mode key. The operation unit 105 provides a user interface (I/F) for operating an image input and output system. These keys are hardware keys, software keys displayed on the LCD, or the like. The hardware keys may not necessarily be provided.

<Block Diagram of Controller>

Next, a block diagram illustrating the controller 103 and peripheral devices will be described with reference to FIG. 2.

Figure 2:
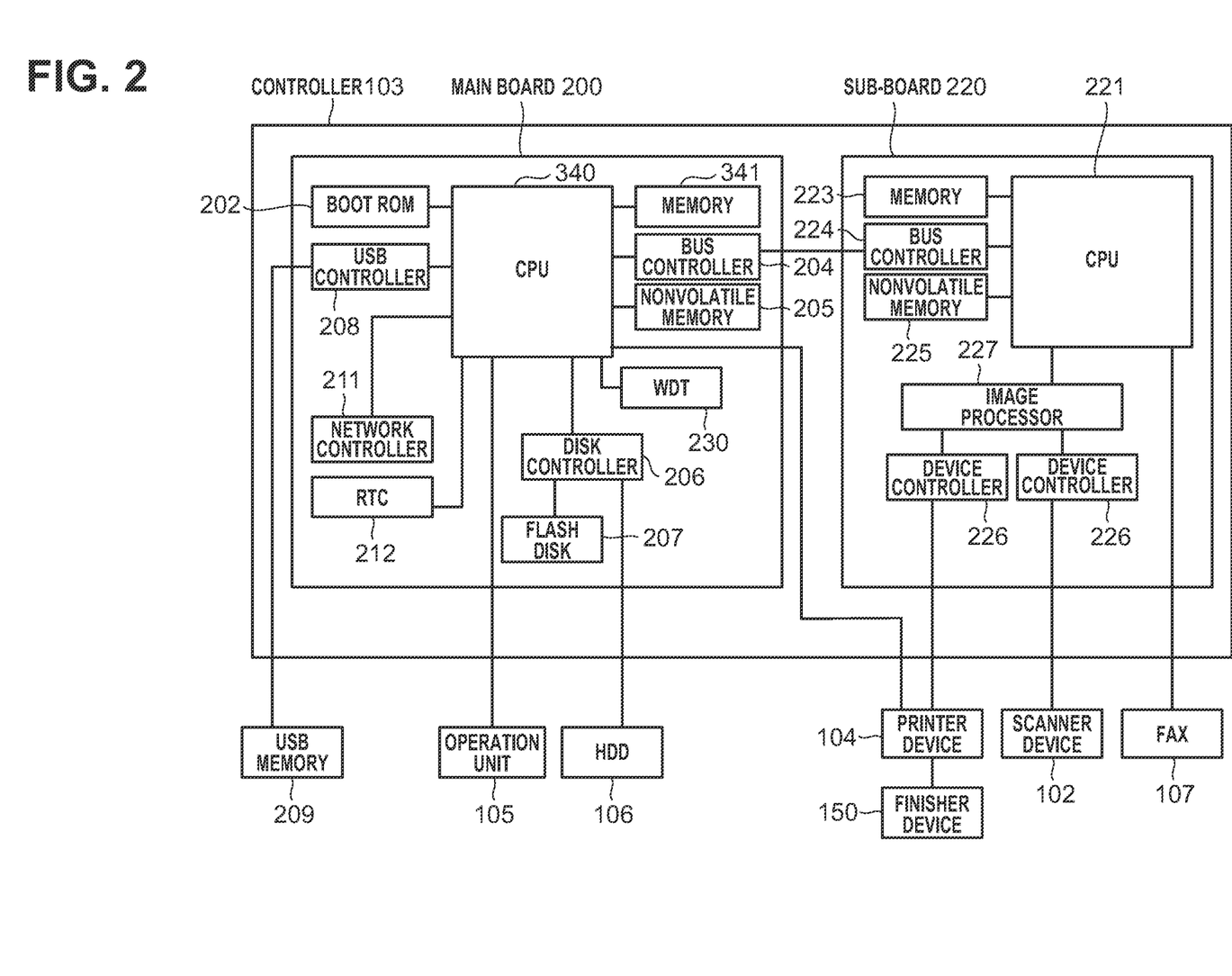
FIG. 2 is a block diagram illustrating a configuration of a controller and peripheral devices of the image forming apparatus according to the example embodiment.

FIG. 2 is a block diagram illustrating an example of a configuration of the controller 103 and the peripheral devices.

The controller 103 includes a main board 200 and a sub-board 220.

The main board 200 is a general-purpose central processing unit (CPU) system. The main board 200 includes a CPU 340, a boot read-only memory (ROM) 202, a memory 341, a bus controller 204, and a nonvolatile memory 205.

The CPU 340 controls the entire operation of the main board 200. The boot ROM 202 stores a boot program. The memory 341 is used as a work memory for the CPU 340. The bus controller 204 has a bridge function with an external bus. The nonvolatile memory 205 is a storage device for storing various kinds of information, and holds the information even after power-off.

The main board 200 also includes a watchdog timer (WDT) 230, a disk controller 206, a flash disk 207, a universal serial bus (USB) controller 208, a network controller (NC) 211, and a real-time clock (RTC) 212.

The WDT 230 monitors and resets the controller 103. The disk controller 206 controls storage devices such as the HDD 106 and the flash disk 207. The flash disk 207 is a storage device that is configured with a semiconductor device and has a relatively small capacity. Examples of the flash disk 207 include an SSD and an eMMC. The USB controller 208 controls a USB device (e.g., a USB memory 209). The NC 211 controls the connection with the LAN 108. The RTC 212 has a clock function.

The USB memory 209, the operation unit 105, the HDD 106, and the like are externally connected to the main board 200.

The sub-board 220 is configured with a relatively small general-purpose CPU system and image processing hardware. The sub-board 220 includes a CPU 221, a memory 223, a bus controller 224, a nonvolatile memory 225, an image processor 227, and device controllers 226.

The CPU 221 controls the entire operation of the sub-board 220. The memory 223 is used as a work memory for the CPU 221. The bus controller 224 has a bridge function with an external bus. The nonvolatile memory 225 is a storage device for storing various kinds of information, and holds the information even after power-off. The image processor 227 performs real-time digital image processing. Each of the device controllers 226 controls an external apparatus. The scanner device 102 and the printer device 104 that are provided outside the sub-board 220 transmit and receive digital image data via the device controllers 226. The CPU 221 directly controls the FAX device 107.

FIG. 2 is a simplified block diagram. For example, the CPU 340 and the CPU 221 include a number of CPU peripheral hardware modules, such as a chip set, a bus bridge, and a clock generator, and these hardware modules are illustrated in a simplified manner The illustration in the block diagram of FIG. 2 is not intended to limit the present disclosure.

An operation of copying an image on a sheet will be described as an example of the operation of the controller 103.

When the user places a paper document on the scanner device 102 and issues an image copy instruction through the operation unit 105, the CPU 340 transmits an image scan instruction to the scanner device 102 via the CPU 221. The scanner device 102 optically scans an image on the paper document, converts the scanned image into digital image data, and inputs the digital image data to the image processor 227 via the corresponding device controller 226. The image processor 227 performs direct memory access (DMA) transfer to temporarily store the digital image data in the memory 223 via the CPU 221.

When the CPU 340 confirms that a certain amount or all of the digital image data is stored in the memory 223, the CPU 340 issues an image output instruction to the printer device 104 via the CPU 221. The CPU 221 informs the image processor 227 of the address of the image data in the memory 223. The image data in the memory 223 is transmitted to the printer device 104 via the image processor 227 and the corresponding device controller 226 based on a synchronous signal from the printer device 104. The printer device 104 prints the digital image data on a sheet.

In the case of printing a plurality of copies, the CPU 340 stores the image data in the memory 223 into the HDD 106 or the like. The image data for the second and subsequent copies can be transmitted to the printer device 104 from the HDD 106 or the memory 223, without receiving the image data from the scanner device 102.

<Configuration of Power Supply>

FIG. 3 is a block diagram illustrating an example of a configuration of the power supply 301 of the image forming apparatus 101. Portions related to the present example embodiment in the configuration of the power supply 301, a power supply control unit 303, the controller 103, the operation unit 105, the scanner device 102, and the printer device 104 in the image forming apparatus 101 will be described with reference to FIG. 3.

Power is constantly supplied from the power supply 301 to the power supply control unit 303 via a power supply line.

Power consumption in the power supply control unit 303 is extremely low and thus, after power-off, the power supply control unit 303 is energized to perform a power control operation.

In the image forming apparatus 101, when the power switch 110 is pressed, the power supply control unit 303 detects the pressing of the power switch 110 and controls a power switch P 310, thereby feeding power to the CPU 340 of the controller 103. Similarly, the power supply control unit 303 controls a power switch Q 311 to feed power to the CPU 305 of the operation unit 105, controls a power switch R 312 to feed power to the scanner device 102, and controls a power switch L 313 to feed power to the printer device 104.

The CPU 340 of the controller 103 can provide a notification to the power supply control unit 303, thereby controlling the power switch Q 311 via the power supply control unit 303 to separately feed power from the power supply 301 to the CPU 305 of the operation unit 105. The CPU 340 of the controller 103 can also provide a notification to the power supply control unit 303, thereby controlling the power switch R 312 via the power supply control unit 303 to separately feed power from the power supply 301 to the scanner device 102. The CPU 340 of the controller 103 can also provide a notification to the power supply control unit 303, thereby controlling the power switch L 313 via the power supply control unit 303 to separately feed power from the power supply 301 to the printer device 104. Additionally, in this case, for example, power supply to the marking unit 141, the paper feed unit 142, and the paper discharge unit 143 of the printer device 104 can be individually controlled, but the description thereof will be omitted.

Power feeding to each block as illustrated in FIG. 3 can be implemented by, for example, configuring the power switch P 310 with two channels. In an active state, relay switches in both of the two channels are turned on. In a sleep state, the relay switch connected to a block to be powered off is turned off, and the other relay switch remains turned on. In a shutdown state, the relay switches in both of the two channels are turned off. With this configuration, a power supply control signal for power switch control is not a binary control signal but a multi-valued control signal depending on the energization state. In the present example embodiment, the detailed description thereof will be omitted. In the above-described power states, including the active state, the sleep state, and the shutdown state, power supply is controlled based on the above-described control. In this control, the power supply control unit 303 may perform multi-valued control of the power switch P 310 to feed power to each block of the controller 103. Alternatively, the CPU 340 of the controller 103 may provide a notification to the power supply control unit 303 to perform multi-valued control of the power switch P 310 via the power supply control unit 303, thereby feeding power to each block of the controller 103. Any other configuration may also be used. The power switch P 310 may be configured with three or more channels to perform power supply control more finely.

<Power Feeding of Power Supply Control Unit in Transition to Sleep State>

Next, active-to-sleep transition processing by the controller 103 will be described.

For example, if the active state in which the user is not using the image forming apparatus 101 has continued for a certain period of time, an auto sleep timer causes the CPU 340 to transition to the sleep state. In this case, the CPU 340 notifies the power supply control unit 303 of the transition to the sleep state to change the power feeding to the controller 103. As described above, the power feeding to each block is implemented for example by the configuration in which the power switch P 310 is configured with two channels and, in the sleep state, the relay switch connected to a block to be powered off is turned off and the other relay switch remains turned on.

In this case, the CPU 340 may provide a notification to the power supply control unit 303 to turn off the power switch Q 311 via the power supply control unit 303, and interrupt the power feeding from the power supply 301 to the operation unit 105, thereby transitioning to the sleep state. Also in this case, the CPU 340 may provide a notification to the CPU 305 of the operation unit 105 by serial communication or the like to cause the CPU 305 of the operation unit 105 to bring an operation panel or a peripheral device into a power saving state, thereby transitioning to the sleep state.

Similarly, the CPU 340 can provide a notification to the power supply control unit 303 to cause the scanner device 102 and the printer device 104 to transition to the sleep state, but the detailed description thereof will be omitted.

<Power Feeding of Power Supply Control Unit in Sleep State>

Next, the sleep state of the image forming apparatus 101 will be described.

The active state corresponds to a state where, for example, the printer device 104 or the scanner device 102 is energized to be ready for immediately executing a job such as copying. The sleep state corresponds to a state where the printer device 104 or the scanner device 102 is powered off and the operation screen of the operation unit 105 is turned off. The sleep state is a state where power consumption is suppressed (low) compared with the active state and a start-up time can be made shorter than a normal start-up time (a start-up time from a power-off state).

For example, the power state transitions to the sleep state, for example, when a certain period of time has passed in a state where the operation unit 105 is not operated by the user, when the touch panel or the power saving key on the operation unit 105 is pressed, or when a set time is reached. In the sleep state, power is fed to the memory 341, an interrupt controller (not illustrated), the NC 211, the RTC 212, the USB controller 208, and the like in the controller 103. In the sleep state, power is also fed to the power saving key of the operation unit 105, a part of the FAX device 107, various sensors, and the like. However, factors for returning from the sleep state vary depending on the system, and thus the power feeding in the sleep state is not limited to this configuration.

A software operation to be performed when the power state returns from the sleep state will be described.

The power supply control unit 303 is capable of receiving an interrupt from the NC 211, the RTC 212 that detects a timer or an alarm, the FAX device 107 that detects an incoming call or off-hook, a software switch, various sensors, or the USB controller 208 that detects insertion/ removal or communication. When receiving one or more interrupts in the sleep state as described above, the power supply control unit 303 starts power feeding. Then, the power supply control unit 303 provides, to the CPU 340, a notification about interrupt causes corresponding to the above-described interrupts. Upon receiving the notification, the CPU 340 performs processing for returning the software state to a normal state, i.e., processing for returning from the sleep state.

<Power Feeding of Power Supply Control Unit in Return from Sleep State>

Next, the processing for returning from the sleep state, which is performed by the controller 103, will be described.

Upon receiving an event (e.g., a power saving key pressing event) that is a factor for returning from the sleep state during the sleep state, the power supply control unit 303 turns on the power switch P 310 and returns the CPU 340 of the controller 103 from the sleep state. A plurality of levels may be set for the sleep state, and an interrupt standby state where the CPU 340 is brought into the standby state may be provided. In a case where the CPU 340 is in the interrupt standby state, the power supply control unit 303 may perform multi-valued control of the power switch P 310 to feed power to each block of the controller 103 and may issue an interrupt signal to the CPU 340, thereby returning the CPU 340 from the sleep state. The detailed description thereof will be omitted.

As described above, the CPU 340 that has returned from the sleep state provides a notification to the power supply control unit 303. In response to the notification, the power supply control unit 303 turns on the power switch Q 311, the power switch R 312, and the power switch L 313 to feed power to the operation unit 105, the scanner device 102, and the printer device 104. Although the illustration of power feeding to the devices such as the FAX device 107 is omitted, the power feeding can be similarly performed.

For example, after completion of a copy job by the user or a print job via a network, the CPU 340 transitions to the sleep state again. The CPU 340 provides a notification about the transition to the sleep state to the power supply control unit 303. In response to the notification, the power supply control unit 303 transmits a power supply control signal to turn off the power switch Q 311, the power switch R 312, and the power switch L 313, thereby stopping the power feeding to the devices other than the controller 103. In this case, for example, the power supply control unit 303 brings the CPU 340 into an interrupt signal waiting state and performs multi-valued control of the power switch P 310 to turn off each block of the controller 103, thereby enabling the CPU 340 to transition to the sleep state. The detailed description thereof will be omitted. If a print job is not generated or acquisition of device information is unnecessary, power is not to be fed to the printer device 104 or the scanner device 102.

The CPU 340 is capable of recognizing the power state (e.g., the active state or the sleep state) of the image forming apparatus 101, and manages the power state using the memory 341 or the like.

<Conventional Processing>

Figure 4:
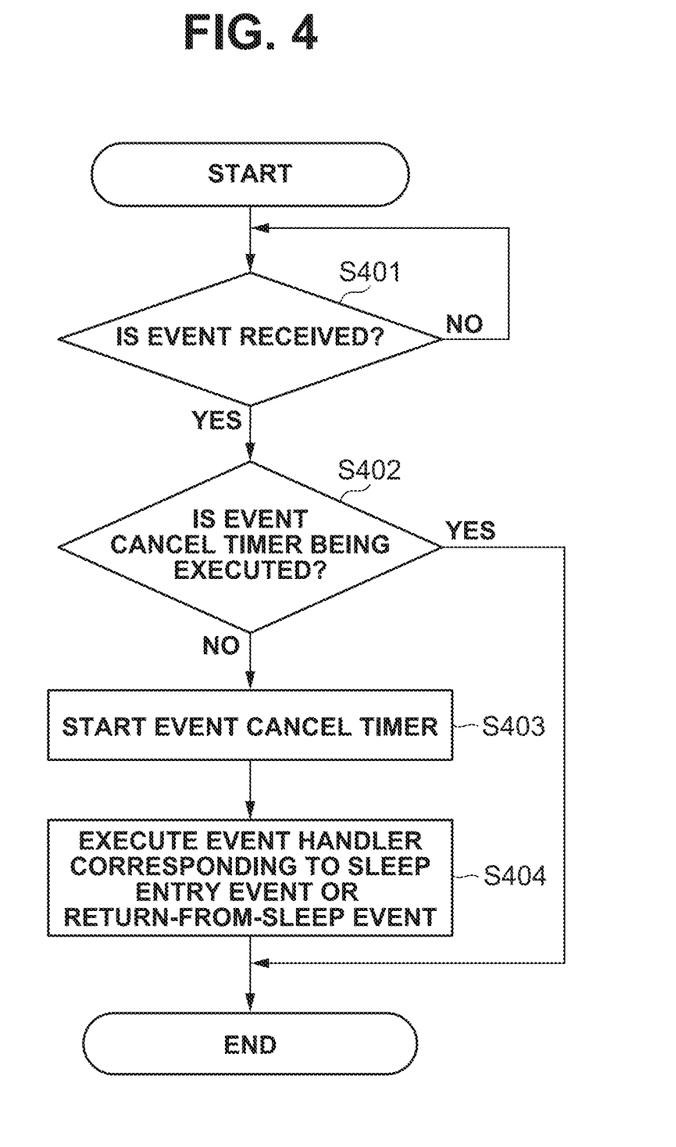
FIG. 4 is a flowchart illustrating processing performed by a conventional image forming apparatus.

FIG. 4 is a flowchart illustrating an example of conventional processing performed when the sleep entry event and the return-from-sleep event continuously occur. Processing in FIG. 5 corresponds to processing according to the present example embodiment, and the processing in FIG. 4 is used for comparison with the processing in FIG. 5.

The flowchart illustrated in FIG. 4 will be described. The processing illustrated in the flowchart of FIG. 4 is implemented by the CPU 340 loading a program stored in the HDD 106 into the memory 341 and executing the program.

In step S401, the CPU 340 determines whether the sleep entry event or the return-from-sleep event (e.g., the event corresponding to pressing a key) is received. If the sleep entry event or the return-from-sleep event is received (YES in step S401), the processing proceeds to step S402. An example of the event received by the CPU 340 in step S401 will be described. If the CPU 340 is in the power-off state, the power supply control unit 303 returns the CPU 340 to a normal power state upon receiving an interrupt, such as pressing the power saving key or opening the front door, and provides a notification about the interrupt return factor to the CPU 340 that has returned to the normal power state. For example, the notification about the interrupt return factor corresponds to the return-from-sleep event that is received by the CPU 340. If the CPU 340 is in the interrupt standby state in the sleep state, the CPU 340 accepts a serial reception (a reception interrupt), as the return-from-sleep event, from a CPU that controls the front door, the CPU 305 of the operation unit 105, the printer device 104, or the like. In the active state, for example, the CPU 340 receives a notification about pressing the power saving key, as the sleep entry event, from the CPU 305 of the operation unit 105. These are merely examples. The CPU 340 may receive the return-from-sleep event from the USB controller 208, the NC 211, or the scanner device 102, or may receive the sleep entry event such as expiration of a sleep timer. The sleep entry event and the return-from-sleep event are not limited to these examples. In the present example embodiment, these events are collectively referred to as events. The CPU 340 is capable of recognizing the factor for returning from the sleep state, the factor for entering the sleep state, and the like based on the notification about the interrupt return factor from the power supply control unit 303 described above, or the contents of serially received packets.

In step S402, the CPU 340 determines whether an event cancel timer is being executed. If the event cancel timer is not being executed (NO in step S402), the processing proceeds to step S403. In step S403, the CPU 340 starts the event cancel timer, and then the processing proceeds to step S404.

The event cancel timer will now be described.

The event cancel timer is used to, in a case where another sleep entry event or return-from-sleep event occurs during a predetermined period after occurrence of a sleep entry event or a return-from-sleep event, prevent the execution of processing (an event handler) corresponding to the other event. In the present example embodiment, the predetermined period is, for example, about one to two seconds. However, the predetermined period is not limited thereto and may be changed depending on the type of an apparatus to be used, users who are expected to use the apparatus, the use status of each user, or the like. The setting of the predetermined period may be changed by an administrator, a service engineer, or the like. The CPU 340 stores, in the memory 341, predetermined information indicating that the event cancel timer is being executed (e.g., a flag is set to on) when the event cancel timer is started. After a lapse of the predetermined period, the CPU 340 deletes the predetermined information from the memory 341 (e.g., the flag is set to off). If the predetermined information is stored in the memory 341, the CPU 340 determines that the event cancel timer is being executed. If the predetermined information is not stored in the memory 341, the CPU 340 determines that the event cancel timer is not being executed. The method for managing the event cancel timer is not limited thereto. Any method can be used as long as the predetermined period can be managed.

Returning to the flowchart in FIG. 4, in step S404, the CPU 340 executes the event handler corresponding to the sleep entry event or the return-from-sleep event received in step S401. More specifically, in a case where the sleep entry event is received, the event handler corresponding to the sleep entry event is executed. On the other hand, in a case where the return-from-sleep event is received, the event handler corresponding to the return-from-sleep event is executed.

If the event cancel timer is being executed (YES in step S402), the CPU 340 does not execute the event handler corresponding to the event received in step S401, and the processing in the flowchart ends.

As described above, in the conventional processing, when the sleep entry event or the return-from-sleep event is received, the event cancel timer is executed, and all of the sleep entry events and the return-from-sleep events are cancelled (ignored) while the event cancel timer is executed. More specifically, in the conventional processing, in a case where the power state is changed to the sleep state based on occurrence of an event, during a predetermined period (a period in which the event cancel timer is executed) after the occurrence of the event, the power state is not to be returned from the sleep state even if a return-from-sleep event occurs. In a case where the power state is changed to the active state based on occurrence of an event, during the predetermined period after the occurrence of the event, the image forming apparatus 101 is not to enter the sleep state even if a sleep entry event occurs.

Examples of the sleep entry event for transitioning from the active state to the sleep state include pressing the power saving key on the operation unit 105, pressing a software power saving key on a UI touch panel of the operation unit 105, and automatic sleep transition using the sleep timer. Examples of the return-from-sleep event for returning from the sleep state to the active state include pressing the power saving key on the operation unit 105, pressing any key on the operation unit 105, pressing the UI touch panel of the operation unit 105, opening or closing the front door cover of the printer device 104, and inserting or removing a print sheet into or from the manual multi paper feed unit of the printer device 104. Other examples of the return-from-sleep event include opening or closing a pressing plate of the scanner device 102, detecting a document on an auto document feeder of the scanner device 102, detecting a card by a near-field communication (NFC) card reader, detection by a human detection sensor, and detecting off-hook of a FAX handset or a FAX incoming call.

In some cases, events, such as pressing the power saving key on the operation unit 105, pressing the UI touch panel of the operation unit 105, or pressing the software power saving key on the UI touch panel of the operation unit 105, occur continuously when the user repeatedly touches the key or the touch panel to repeat the input. If the event handlers corresponding to the sleep entry event and the return-from-sleep event are continuously executed in response to such events, the lifetime of the device may be affected. Thus, it is appropriate to cancel the sleep entry event and the return-from-sleep event for a certain period of time immediately after returning to the active state. On the other hand, opening or closing the front door cover, detecting a sheet, or the like is an isolated event that basically occurs once, except for chattering of hardware signals. If this type of events is cancelled similarly to the others, the subsequent use case by the user may not be executed.

As described above, there may be a situation where events for transitioning between the active state and the sleep state continuously occur. In such a situation, if the event handler for transition to the sleep state is executed and then the subsequent return-from-sleep event is always cancelled for a certain period of time, the event handler for transition from the sleep state to the active state may not be executed. As a result, the desired return-from-sleep event may be cancelled, which may make the user unable to perform the subsequent operation.

To address the issue, in the present example embodiment, in a case where the power state has transitioned to the sleep state based on occurrence of an event, and a return-from-sleep event is received within a certain period of time after the occurrence of the event, control is performed in such a manner that some types of return-from-sleep events are discarded and other types of return-from-sleep events are not discarded. This configuration makes it possible to appropriately return from the sleep state. This will be described in detail below with reference to FIG. 5.

<Processing According to Present Example Embodiment>

Figure 5:
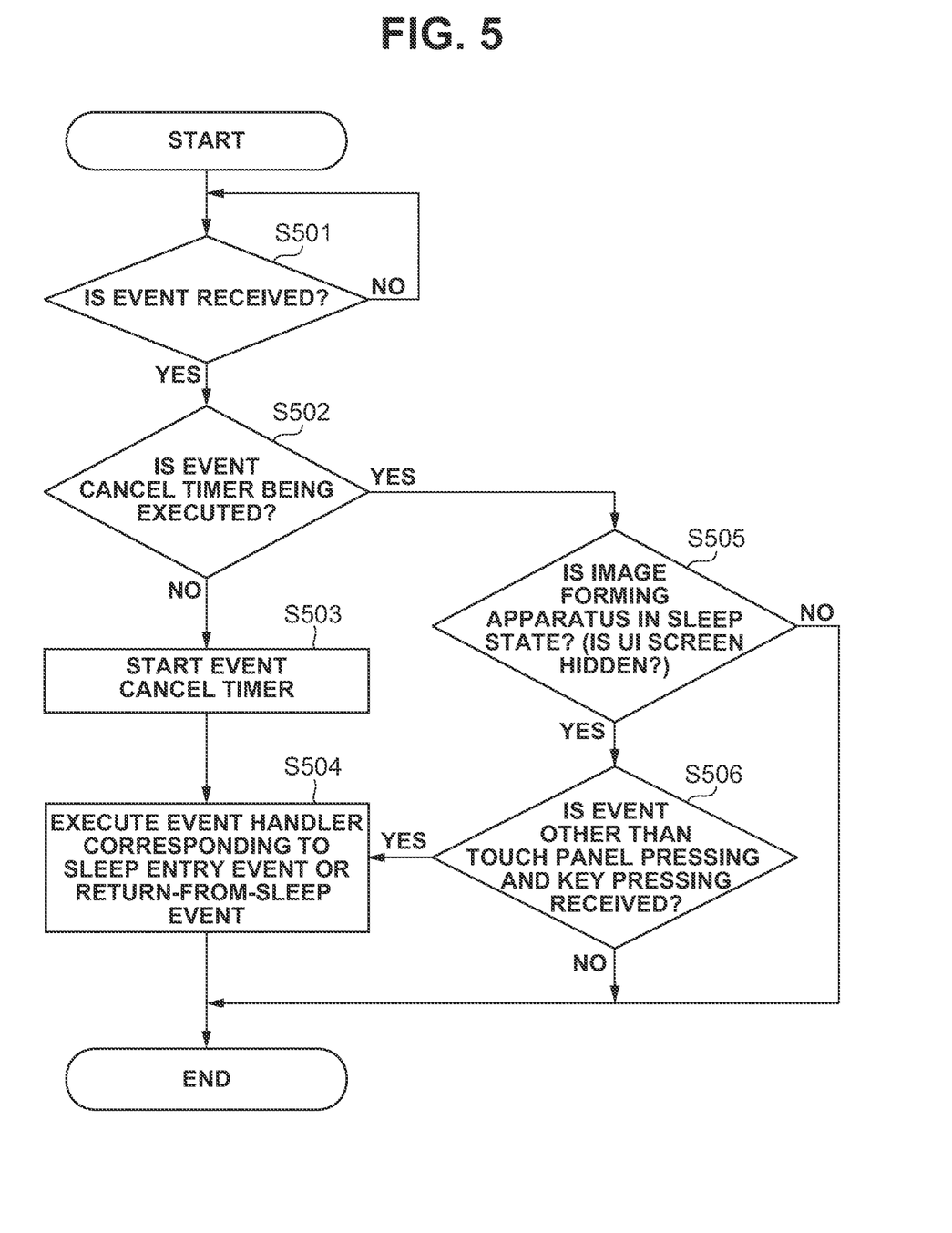
FIG. 5 is a flowchart illustrating processing performed by the image forming apparatus according to the example embodiment.

FIG. 5 is a flowchart illustrating an example of processing according to the present example embodiment that is performed when the sleep entry event and the return-from-sleep event continuously occur. The processing illustrated in the flowchart of FIG. 5 is implemented by the CPU 340 loading a program stored in the HDD 106 into the memory 341 and executing the program as appropriate. The processing in steps S501 to S504 illustrated in FIG. 5 is similar to the processing in steps S401 to S404 illustrated in FIG. 4, respectively. The processing illustrated in FIG. 5 differs from the processing illustrated in FIG. 4 in that processing in steps S505 and S506 is carried out when the determination result in step S502 illustrated in FIG. 5 is "YES". The steps in FIG. 5 that are similar to those in FIG. 4 will be briefly described, and the steps that are different from those in FIG. 4 will be described in detail.

In step S501, the CPU 340 determines whether the sleep entry event or the return-from-sleep event (e.g., the event corresponding to pressing a key) is received. If the sleep entry event or the return-from-sleep event is received (YES in step S501), the processing proceeds to step S502.

In step S502, the CPU 340 determines whether the event cancel timer is being executed. If the event cancel timer is not being executed (NO in step S502), the processing proceeds to step S503. In step S503, the CPU 340 starts the event cancel timer, and then the processing proceeds to step S504. In step S504, the CPU 340 executes the event handler corresponding to the sleep entry event or the return-from-sleep event received in step S501.

On the other hand, if the event cancel timer is being executed (YES in step S502), the processing proceeds to step S505.

In step S505, the CPU 340 determines whether the power state of the image forming apparatus 101 is the sleep state, i.e., whether the UI screen of the operation unit 105 is hidden. If the image forming apparatus 101 is not in the sleep state (NO in step S505), the CPU 340 does not execute the event handler corresponding to the event received in step S501, and the processing in the flowchart ends.

If the image forming apparatus 101 is in the sleep state (YES in step S505), the processing proceeds to step S506. In step S506, the CPU 340 determines whether the event received in step S501 is an event other than the event of pressing the touch panel and the event of pressing a key. If the received event is the event of pressing the touch panel or the event of pressing a key (NO in step S506), the CPU 340 does not execute the event handler corresponding to the event received in step S501, and the processing in the flowchart ends.

On the other hand, if the received event is an event other than the event of pressing the touch panel and the event of pressing a key (YES in step S506), the processing proceeds to step S504. In step S504, the CPU 340 executes the event handler corresponding to the return-from-sleep event received in step S501.

According to the present example embodiment, in a case where the image forming apparatus 101 enters the sleep state based on occurrence of a sleep entry event, and receives a return-from-sleep event during a predetermined period after the occurrence of the sleep entry event, some types of return-from-sleep events are to be discarded and other types of return-from-sleep events are not to be discarded. This makes it possible to appropriately return from the sleep state. For example, in a case where the power state is changed to the sleep state based on occurrence of an event, the event cancel timer is started. In a case where a return-from-sleep event occurs during a predetermined period (a period in which the event cancel timer is executed) after the occurrence of the event, and the return-from-sleep event that has occurred is the event of pressing the touch panel or the event of pressing a key, the power state is not to be returned from the sleep state. On the other hand, in a case where the return-from-sleep event that has occurred is an event other than the event of pressing the touch panel and the event of pressing a key, the power state is to be returned from the sleep state. Meanwhile, in a case where the power state is changed to the active state based on occurrence of an event, the event cancel timer is started. During the predetermined period after the occurrence of the event, the image forming apparatus 101 is not to enter the sleep state even if the sleep entry event occurs.

More specifically, in a case where the sleep entry event or the return-from-sleep event is received, the image forming apparatus 101 executes the event cancel timer. During the period in which the event cancel timer is executed, all types of sleep entry events and some types of return-from-sleep events (specific return-from-sleep events) are to be cancelled. Some types of return-from-sleep events to be cancelled are events that can occur a plurality of times in a short period of time and can cause repeated transition between the entry of the sleep state and the return from the sleep state. Specific examples thereof are the return-from-sleep events among the repeated pressing of the power saving key, the entry of the sleep state by the pressing of the power saving key and the return from the sleep state by the pressing of any key, the entry of the sleep state by the pressing of the software power saving key and the return from the sleep state by the pressing of the UI touch panel. More specifically, the return-from-sleep events to be canceled include an event of operating an operation key (a power saving key pressing event or an any key pressing event) and an event of touching the touch panel (a UI touch panel pressing event). Cancellation of these return-from-sleep events is a measure to be taken against the user performing continuous operation in a short period of time, and the execution of the event handlers corresponding to these events is to be cancelled.

Examples of some types of return-from-sleep events that are not to be cancelled include an event that is not to cause a plurality of event handlers in a short period of time, and an event associated with the subsequent operation to be performed by the user after the power state is returned from the sleep state. Specific examples of the events include opening or closing the front door cover of the printer device 104, and inserting or removing a print sheet into or from the manual multi paper feed unit of the printer device 104. Other examples of the events include opening or closing the pressing plate (not illustrated) of the scanner device 102, detecting a document on the auto document feeder of the scanner device 102, detection of a card by an NFC card reader, detection by a human detection sensor, and detecting off-hook of a FAX handset or a FAX incoming call. These events are merely examples, and the events are not limited thereto.

The present example embodiment provides a measure against continuous reentry of the sleep entry event and the return-from-sleep event in a short period of time, and on how to treat the return-from-sleep event that occurs within a certain period of time after the power state transitions to the sleep state. According to the present example embodiment, it is possible to appropriately return from the sleep state while suppressing the influence of the frequent transition between the active state and the sleep state on the lifetime of products.

The above-described configurations and contents of various types of data are not limited to those described above, and various configurations and contents can be used depending on the intended use or purpose.

While the example embodiment of the present disclosure has been described above, the present example embodiment can also be implemented as, for example, a system, an apparatus, a method, a program, a storage medium, and the like. More specifically, the present example embodiment may be applied to a system including a plurality of devices, or may be applied to an apparatus configured with one device.

The example embodiment of the present disclosure also includes all combinations of the configurations according to the above-described example embodiment.

The example embodiment of the present disclosure can also be implemented by processing in which a program for implementing one or more functions according to the above-described example embodiment is supplied to a system or an apparatus via a network or a storage medium, and one or more processors in a computer of the system or the apparatus read out and execute the program. The example embodiment of the present disclosure can also be implemented by a circuit (e.g., an application specific integrated circuit (ASIC)) for implementing one or more functions according to the example embodiment.

The example embodiment of the present disclosure may be applied to a system including a plurality of devices, or may be applied to an apparatus configured with one device.

The present disclosure is not limited to the above-described example embodiments, and various modifications (including organic combinations of the example embodiments) can be made based on the scope of the present disclosure, and these modifications should not be excluded from the scope of the present disclosure. Any configurations obtained by combining the above-described example embodiments and modified examples thereof are also included in the present disclosure.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2021-102670, filed Jun. 21, 2021, which is hereby incorporated by reference herein in its entirety.

What is claimed is:

1. An image forming apparatus configured to switch between a first power state and a second power state that is lower in power consumption than the first power state, the image forming apparatus comprising:
one or more controllers having one or more processors and one or more memories, the one or more controllers configured to:
switch a power state of the image forming apparatus based on occurrence of an event,
wherein, when the power state of the image forming apparatus is switched to the second power state based on occurrence of an event, during a predetermined period after the occurrence of the event, the power state is not switched to the first power state in a case where a specific event corresponding to switching to the first power state occurs, and the power state is switched to the first power state in a case where an event corresponding to switching to the first power state and different from the specific event occurs.

2. The image forming apparatus according to claim 1, further comprising an operation key configured to operate the image forming apparatus,
wherein the specific event includes an event of operating the operation key.

3. The image forming apparatus according to claim 1, further comprising a touch panel configured to operate the image forming apparatus,
wherein the specific event includes an event of touching the touch panel.

4. The image forming apparatus according to claim 1, wherein, when the power state of the image forming apparatus is switched to the first power state based on occurrence of an event, during the predetermined period after the occurrence of the event, the power state is not switched to the second power state even in a case where an event corresponding to switching to the second power state occurs.

5. A control method for an image forming apparatus configured to switch between a first power state and a second power state that is lower in power consumption than the first power state, the control method comprising:
controlling switching of a power state of the image forming apparatus based on occurrence of an event,
wherein, when the power state of the image forming apparatus is switched to the second power state based on occurrence of an event, during a predetermined period after the occurrence of the event, the power state is not switched to the first power state in a case where a specific event corresponding to switching to the first power state occurs, and the power state is switched to the first power state in a case where an event corresponding to switching to the first power state and different from the specific event occurs.

6. A non-transitory computer-readable storage medium that stores a program for causing a computer to function as the one or more controllers of the image forming apparatus according to claim 1.

* * * * *